United States Patent
Drews-Nicolai et al.

(10) Patent No.: US 7,147,702 B2
(45) Date of Patent: *Dec. 12, 2006

(54) METHOD FOR THE SURFACE TREATMENT OF A TITANIUM DIOXIDE PIGMENT

(75) Inventors: Lydia Drews-Nicolai, Köln (DE); Siegfried Bluemel, Ratigen (DE); Volker Jürgens, Kirchhundem (DE); Volker Schmitt, Leichlingen (DE)

(73) Assignee: Kronos International (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/889,287

(22) Filed: Jul. 12, 2004

(65) Prior Publication Data

US 2005/0011408 A1   Jan. 20, 2005

(51) Int. Cl.
C09C 1/36 (2006.01)
C01G 23/047 (2006.01)
B32B 5/16 (2006.01)

(52) U.S. Cl. .................. 106/443; 106/444; 428/403

(58) Field of Classification Search ............... 106/443, 106/444; 428/403
See application file for complete search history.

(56) References Cited

U.S. PATENT DOCUMENTS

| 5,165,995 | A | * | 11/1992 | Losoi | 428/403 |
| 5,665,466 | A | * | 9/1997 | Guez et al. | 428/329 |
| 6,342,099 | B1 | * | 1/2002 | Hiew et al. | 106/443 |

* cited by examiner

Primary Examiner—Anthony J. Green
(74) Attorney, Agent, or Firm—Rodney T. Hodgson

(57) ABSTRACT

The invention relates to a method for the surface treatment of a titanium dioxide that leads to pigments with improved retention and improved opacity, where consistently high opacity can be obtained using less pigment. The method is characterised in that an aluminium component and a phosphorus component are first added to a $TiO_2$ suspension, during which process its pH value does not drop below 10. The pH value of the suspension is subsequently lowered to below 9 by adding an acid component. The pigment produced by the method according to the invention is eminently suited to use in decorative laminating paper.

22 Claims, No Drawings

METHOD FOR THE SURFACE TREATMENT OF A TITANIUM DIOXIDE PIGMENT

The invention relates to a method for the surface treatment of a titanium dioxide pigment, a titanium dioxide pigment with high opacity and high retention, and its use in the production of decorative laminating paper.

Decorative laminating paper is an element of a decorative thermoset coating material, which is used with preference for finishing furniture surfaces and for laminate floorings. Laminate is the term used for materials in which, for example, several impregnated, stacked layers of paper, or paper and hardboard or particle board, are pressed together. The use of special synthetic resins results in extraordinarily high resistance of the laminates to scratching, impact, chemicals and heat.

The use of special-purpose papers (decorative laminating papers) permits the production of decorative surfaces, where the decorative laminating paper serves not only as facing paper for unattractive wood material surfaces, for example, but also as a carrier for the synthetic resin.

The requirements imposed on decorative laminating paper include, for example, opacity (hiding power), light-fastness (greying resistance), colour-fastness, wet strength, impregnability and printability.

In principle, a pigment based on titanium dioxide is eminently suitable for achieving the necessary opacity of the decorative laminating paper. As a rule, a titanium dioxide pigment or a titanium dioxide pigment suspension is mixed with a pulp suspension in paper production. In addition to the pigment and pulp used as feedstock, auxiliaries, such as wet strength agents, are generally also used and, where appropriate, further additives, such as certain fillers. The interactions between the individual components (pulp, pigment, auxiliaries and additives, water) contribute to formation of the paper and determine the retention of the pigment. The term retention refers to the capacity for retention of all inorganic substances in the paper during production. Low retention of the pigment impairs the opacity of the decorative laminating paper, thus having a negative impact on the cost-efficiency of the process and leading to environmental and recycling problems in paper production.

A number of titanium dioxide pigments exist for application in decorative laminating paper. Among the most important properties, alongside good brightness and light-fastness, are the retention and opacity. Light-fastness primarily means the resistance of the laminates to greying when exposed to light.

It is known that improved retention and/or opacity, as well as improved light-fastness, can be achieved by means of special kinds of post-treatment.

Numerous patented methods are known for improving light-fastness, in particular. According to them, the pigments are surface-treated with different substances, such as with aqueous $Al_2O_3$ and a colourless metal phosphate (U.S. Pat. No. 3,926,660), with zinc/aluminium phosphate (U.S. Pat. No. 5,114,486), with aluminium phosphate (U.S. Pat. No. 5,785,748) or with cerium phosphate and with aluminium phosphate (U.S. Pat. No. 4,239,548). These patents are concerned with the light-fastness of $TiO_2$-pigmented melamine resin systems, where, in particular, the retention properties of the pigments play no role. Moreover, these methods are characterised by the fact that the phosphate surface treatment is based on a $TiO_2$ base material suspension with a pH value in the acid range. Starting from the acid range, the pH value is raised to the range of roughly 5 to 8 during or after addition of the individual post-treatment components.

EP 0 713 904 B1 describes a way of increasing the retention by post-treatment, where a first layer of aluminium oxide phosphate is applied at an acid pH value of 4 to 6, and a second layer consisting of aluminium oxide is precipitated in a pH range from 3 to 10, preferably at a pH of roughly 7. A further improvement in retention is achieved by a third layer consisting of magnesium oxide, meaning that the pigment produced is characterised by successive layers of aluminium oxide phosphate, aluminium oxide and magnesium oxide.

Another option for increasing retention is disclosed in U.S. Pat. No. 5,705,033. Addition of a cationic polymer, e.g. "Nalco 8105", a copolymer of acrylamide and diallyl dimethyl ammonium chloride, results in better fixation of the pigment on the pulp fibres and increased retention.

The object of the invention is to describe a method by which pigments for use in decorative laminating papers can be produced that display better retention compared to the prior art, while maintaining at least equally high opacity and good light-fastness.

The object is solved by post-treatment of the titanium dioxide pigment in such a way that, during post-treatment, an aluminium component and a phosphorus component are added to the titanium dioxide suspension in a first step, the pH value being maintained at a minimum of 10 during this time, and the pH value is lowered to 9 or less in a second step by adding an acid component.

Other advantageous versions of the method are described in the dependent claims.

The subject of the invention is thus a post-treatment method for titanium dioxide pigments that leads to pigments with improved retention and consistently high opacity, as well as a pigment displaying these properties, and the use of this pigment in the production of decorative laminating paper.

In the method according to the invention, a layer of aluminium-phosphorus compounds, possibly in a mixture with hydrous aluminium oxide, is deposited on the surface of the $TiO_2$ particle. The composition is dependent on the quantities of aluminium and phosphorus component used. In simplified terms, this layer will be referred to as the aluminium oxide phosphate layer below.

The invention is based on the fact that the aluminium oxide phosphate layer is precipitated from the alkaline medium. It is decisive for the method that the aluminium component and the phosphorus component are initially added to the alkaline $TiO_2$ suspension, which has a minimum pH value of 10, and that the pH value does not drop below 10 during addition. It has been found that, given compliance with these conditions, improved retention of the pigments can be achieved compared to the known methods, where aluminium oxide phosphate is precipitated from the acid medium, and also compared to procedures in which the pH value of the suspension drops to below 9 during addition of the aluminium component and the phosphorus component.

The surface treatment method on which the invention is based works on the basis of an aqueous, preferably wet-milled $TiO_2$ base material suspension. Wet milling is performed in the presence of a dispersing agent, where appropriate. $TiO_2$ base material means the raw $TiO_2$ pigment that has not yet been post-treated. $TiO_2$ base material manufactured by the chloride process is used with preference. The method is performed at a temperature of less than 80° C., preferably at 55 to 65° C.

The suspension is first set to a pH value of at least 10 using suitable, alkaline compounds, e.g. NaOH. If wet milling is performed, this is ideally done before milling.

In Step a) of the method according to the invention, an aluminium component and a phosphorus component are subsequently added to the suspension, each in the form of an aqueous solution. It is decisive for the invention that, during the addition of the components, the pH value of the suspension is maintained at 10 at least, preferably at 10.5 at least, and particularly preferably at 11 at least.

Suitable aluminium compounds are alkaline or acid-reacting, water-soluble salts, such as sodium aluminate, aluminium sulphate, aluminium nitrate, aluminium chloride, aluminium acetate, etc. This selection is not, however, to be understood as a limitation. Sodium aluminate is particularly suitable. If an acid-acting compound is involved, which would depress the pH value to below 10 upon addition, this effect must, for the purposes of the invention, be compensated for by adding a suitable, alkaline compound, such as NaOH. The person skilled in the art is familiar with the suitable, alkaline compounds and the quantities necessary to maintain the pH value at a minimum of 10. The aluminium compound is to be added in a quantity of 2.0 to 9.0% by weight, preferably 4.0 to 6.0% by weight, calculated as $Al_2O_3$ and referred to the $TiO_2$ base material.

Suitable phosphorus compounds are inorganic compounds, such as alkali phosphates, ammonium phosphate, polyphosphates, phosphoric acid, etc. This selection is not to be understood as a limitation. Disodium hydrogenphosphate or phosphoric acid is particularly suitable. In the event of phosphorus compounds whose addition would depress the pH value to below 10, this effect must likewise be compensated for by adding a suitable, alkaline compound, such as NaOH. The person skilled in the art is familiar with the suitable, alkaline compounds and the quantities necessary to maintain the pH value at a minimum of 10. The phosphorus component is added in a concentration of 1.0 to 5.0% by weight, preferably 1.5 to 3.5% by weight, and particularly 2.0 to 3.0% by weight, calculated as $P_2O_5$ and referred to the $TiO_2$ base material.

The Al component and the P component can be added to the suspension in any desired order, individually in succession or simultaneously.

An acid compound is subsequently added in Step b), in order to lower the pH value to below 9, preferably to the range from 3.5 to 8 and particularly preferably to between 4.5 and 6.0.

The acid compound used can be an acid, such as sulphuric acid, hydrochloric acid, phosphoric acid or any other suitable acid. Furthermore, the acid compound can also be a corresponding, acid-reacting salt, such as aluminium sulphate.

It has proven advantageous, in a subsequent Step c), to apply a layer in the form of hydrous aluminium oxide with the help of "fixed-pH" treatment in such a way that the pH value is very largely maintained at a constant level by parallel addition of an acid and an alkaline aluminium compound (e.g. sodium aluminate/aluminium sulphate), or by addition of an alkaline aluminium compound, such as sodium aluminate, and an acid, such as sulphuric acid, or by addition of an acid aluminium compound, e.g. aluminium sulphate, together with a lye, such as NaOH. In this context, pH values between 4 and 9 have proven to be favourable for the fixed-pH treatment. For example, lyes or acids (e.g. $NaOH/H_2SO_4$), or alkaline or acid-reacting salt solutions (e.g. sodium aluminate/aluminium sulphate), are suitable for setting this pH value. It has proven particularly advantageous to perform the fixed-pH treatment at the level to which the pH value was lowered in Step b). The pH value is held constant within limits reflecting the normal variations of pH as are known to one of skill in the art of industrial processes.

Finally, in Step d), the pH is set to roughly 6 to 7 as necessary, for instance using lyes/acids (e.g. $NaOH/H_2SO_4$), or using alkaline/acid salt solutions, such as sodium aluminate/aluminium sulphate.

The quantities of the aluminium compounds used in Steps b), c) and d), calculated as $Al_2O_3$, must be added to the quantity of $Al_2O_3$ already used in Step a). The total of the aluminium compounds used in Step a) to Step d), calculated as $Al_2O_3$ referred to the $TiO_2$ base material, is ideally 2.0 to 9.0% by weight and preferably 4.0 to 6.0% by weight. Similarly, the quantity of the phosphorus component possibly used in Step b) and Step c), calculated as $P_2O_5$, must be added to the quantity of $P_2O_5$ used in Step a). The total of the phosphorus compounds used in Step a) to Step c), calculated as $P_2O_5$, is thus ideally 1.0 to 5.0% by weight, preferably 1.5 to 3.5% by weight, and particularly 2.0 to 3.0% by weight, calculated as $P_2O_5$ referred to the $TiO_2$ base material.

Together with the Al component and the P component, other metal salt solutions, e.g. of Ce, Ti, Si, Zr or Zn, can also be added to the suspension in Step a), these subsequently being jointly precipitated onto the particle surface in Step b) as phosphate or hydrated oxide.

Furthermore, it is also possible, either before or after Step c), to apply a further inorganic layer of the kind known from the prior art (e.g. compounds containing Zr, Ce, Si, Ti or Zn).

The post-treated $TiO_2$ pigment is separated from the suspension by filtration methods known to the person skilled in the art, and the resultant filter cake is washed in order to remove the soluble salts. To improve the light-fastness of the pigment in the laminate, a nitrate-containing compound, e.g. $KNO_3$, $NaNO_3$, $Al(NO_3)_3$, can be added to the washed filter paste in a quantity of 0.05 to 0.5%, calculated as $NO_3$, before or during subsequent drying.

During subsequent milling, e.g. in a steam mill, an organic compound can be added to the pigment from the range of those that are customarily used in the manufacture of $TiO_2$ pigments and are known to the person skilled in the art, such as polyalcohol (trimethylpropane). As an alternative to addition of the nitrate-containing compounds before or during drying, such substances can also be added during milling.

Compared to the reference pigments, the pigment produced according to this method displays improved retention and improved opacity, and is optimally suited to use in decorative laminating paper.

The post-treatment method according to the invention is customarily performed in batch mode. However, with the help of an inline mixer that ensures optimum homogenisation, it is also possible to work in semi-continuous mode. At all events, it must be ensured that the Al component and the P component are added in a pH range of at least 10 before precipitation.

An example of the invention is described below:

EXAMPLE 1

A sand-milled $TiO_2$ suspension from the chloride process with a $TiO_2$ concentration of 450 g/l is set to a pH value of 10 with NaOH at 60° C. While stirring, 2.0% by weight $Al_2O_3$ are added to the suspension in the form of sodium aluminate. A pH value of roughly 13 is reached in the process. After stirring for 30 minutes, 2.5% by weight $P_2O_5$ are added in the form of disodium hydrogenphosphate solution. The pH value of the suspension remains at about 13. This is followed by stirring for a further 30 minutes. In the next step, the suspension is set to a pH value of 5 by adding aluminium sulphate (corresponding to 2.4% by weight $Al_2O_3$). Subsequently, 0.9% by weight $Al_2O_3$ is admixed in the form of parallel addition of aluminium sulphate and sodium aluminate solution, so that the pH value is maintained at 5. After stirring for 60 minutes, the suspension is set to a pH value of 6.8 with the help of an alkaline sodium aluminate solution.

After stirring for a further two hours, the post-treated $TiO_2$ suspension is filtered and freed from the water-soluble salts by washing. After addition of roughly 0.18% $NO_3$ in the form of $NaNO_3$, the washed filter paste is dried in a spray drier and subsequently steam-milled.

The pigment manufactured according to the invention contains the following post-treatment elements, expressed in the form of their oxides: 2.5% by weight $P_2O_5$ and 5.5% by weight $Al_2O_3$, each referred to the $TiO_2$ base material, and 0.18% by weight $NO_3$.

COMPARATIVE EXAMPLE 1

A sand-milled $TiO_2$ suspension from the chloride process with a $TiO_2$ concentration of 450 g/l is set to a pH value of 10 with NaOH at 60° C. While stirring, 2.4% by weight $P_2O_5$ are added to the suspension in the form of disodium hydrogenphosphate solution. The solution is added over a period of 60 minutes, and the pH value of the suspension remains at roughly 10. After stirring for 30 minutes, 3.0% by weight $Al_2O_3$ in the form of acid aluminium sulphate solution are subsequently added to the suspension within 30 minutes. The pH value of the suspension drops to 2.5. After stirring for 30 minutes, the acid suspension is set to a pH value of 7 with the help of an alkaline sodium aluminate solution in a quantity of 3.4% by weight, calculated as $Al_2O_3$. After stirring for a further two-and-a-half hours, the post-treated $TiO_2$ suspension is filtered and freed from the water-soluble salts by washing. After addition of roughly 0.23% by weight $NO_3$ in the form of $NaNO_3$, the washed filter paste is dried in a spray drier and subsequently steam-milled.

The reference pigment manufactured in this way contains the following post-treatment elements, expressed in the form of their oxides: 2.4% $P_2O_5$ and 6.4% $Al_2O_3$, each referred to the $TiO_2$ base material, and 0.23% by weight $NO_3$.

COMPARATIVE EXAMPLE 2

A sand-milled $TiO_2$ suspension from the chloride process with a $TiO_2$ concentration of 450 g/l is set to a pH value of 10 with NaOH at 60° C. While stirring, the suspension is subsequently set to a pH value of 5 using phosphoric acid. After stirring for 30 minutes, 2.1% by weight $P_2O_5$ is added to the suspension in the form of $H_3PO_4$ (80%), together with 2.0% by weight $Al_2O_3$ in the form of sodium aluminate solution, within 60 minutes, where the pH value is maintained at pH 5 by parallel addition of the two components or after consumption of the phosphoric acid with $H_2SO_4$. After stirring for 30 minutes, the suspension is set to a pH value of 7 with the help of an alkaline sodium aluminate solution. This is followed by the addition of 2.3% $Al_2O_3$ in the form of parallel addition of sodium aluminate and aluminium sulphate at a pH value of roughly 7. After stirring for a further two-and-a-half hours, the post-treated $TiO_2$ suspension is filtered and freed from the water-soluble salts by washing. After addition of roughly 0.18% by weight $NO_3$ in the form of $NaNO_3$, the washed filter paste is dried in a spray drier and subsequently steam-milled.

The reference pigment manufactured in this way contains the following post-treatment elements, expressed in the form of their oxides: 2.5% $P_2O_5$ and 4.5% $Al_2O_3$, each referred to the $TiO_2$ base material, and 0.18% by weight $NO_3$.

Test Methods and Test Results

Test Methods

The titanium dioxide pigments produced in this way were incorporated into decorative laminating paper and subsequently tested as regards their optical properties and light-fastness in pressed laminates. To this end, the titanium dioxide pigment to be tested was incorporated into pulp, and sheets with a sheet weight of roughly 80 g/m² and a $TiO_2$ content of about 40% by mass were produced.

a) Laminate Production (Laboratory Scale)

For assessing the optical properties of decorative laminating papers, and thus the quality of the titanium dioxide pigment, it is important to compare decorative laminating papers with identical ash contents. This makes it necessary for the quantity of titanium dioxide pigment used for forming the sheet to be adapted, in accordance with the retention, to the required $TiO_2$ content by mass in the paper, 40±1% in this case, or the required grammage, 80±1 g/m² in this case. In these tests, 1.56 g pulp (oven-dry) was taken as the basis for the formation of a sheet. The procedure and the auxiliaries used are familiar to the person skilled in the art.

The titanium dioxide content (ash in [%]) of a sheet and the retention of the pigment were subsequently determined. The titanium dioxide content was determined by incinerating a defined weight of the produced paper in a rapid incinerator at 900° C. The $TiO_2$ content by mass (ash in [%]) can be calculated by weighing the residue. The following formula was used as the basis for calculating the ash content:

Ash content $[g/m^2]$=(Ash [%]×Grammage $[g/m^2]$)/ 100 [%].

The retention is defined as the capacity to retain all inorganic substances in the sheet of paper on the wire of the paper-making machine. The "one-pass retention" determined here indicates the percentage retained during a single pass through the paper-making machine. The ash content in percent, referred to the percentage by mass of the pigment used relative to the total solids in the suspension, yields the retention:

$$\text{Retention}[\%] = \frac{\text{Ash}[\%] \times (\text{Pigment weight}[g] + \text{Pulp weight}[g])}{\text{Pigment weigh}[g]}$$

The further processing of the paper encompassed its impregnation and pressing into laminates. The sheet to be impregnated with resin was completely immersed in a melamine resin solution, then drawn between 2 doctor blades to ensure application of a specific amount of resin and subsequently pre-condensed at 130° C. in a recirculating-air drying oven. Impregnation was performed a second time in similar manner. The amount of resin applied was 120 to 140% of the weight of the sheet. The sheet had a residual moisture content of 5 to 6% by weight. The condensed sheets were combined into books with phenolic resin-impregnated core papers and black underlay paper. The laminate structure used for assessing the test pigments comprised 9 layers: decorative laminating paper, decorative laminating paper, core paper, core paper, underlay paper consisting of black underlay, core paper, core paper, black underlay, decorative laminating paper.

The books were pressed for 300 seconds with the help of a Wickert Type 2742 laminating press at a temperature of 140° C. and a pressure of 90 bar.

b) Testing

The optical properties of the laminates were measured using a commercially available spectrophotometer In order to assess the optical properties of laminates, the optical values (CIELAB L*, a*, b*) to DIN 6174 were measured with the help of the ELREPHO® 3000 calorimeter over two decorative laminating papers and over black underlay. The opacity is a measure of the light transmission of the paper. The following parameters were selected as a measure of the opacity of the laminates: CIELAB $L^*_{black}$, the brightness of the laminates measured over black underlay paper, and the opacity value $L [\%]=Y_{black}/Y_{white}\times 100$, determined from the Y-value measured over black underlay paper ($Y_{black}$) and the Y-value measured over two decorative laminating papers ($Y_{white}$).

TABLE 1

| Pigment | Pigment weight [g] | Ash [%] | Ash content [g/m²] | Grammage [g/m²] | Retention [%] |
|---|---|---|---|---|---|
| Example 1 | 2.1 | 41.7 | 34.8 | 83.3 | 73 |
| Comparative example 1 | 2.2 | 40.6 | 32.9 | 81.1 | 69 |
| Comparative example 2 | 2.1 | 40.1 | 32.3 | 80.4 | 70 |

TABLE 2

| | Pigment weight [g] | Ash content [g/m²] | Optical properties (laminate) | | | Opacity (laminate) | |
|---|---|---|---|---|---|---|---|
| Pigment | | | CIELAB $L^*_{white}$ | CIELAB $a^*_{white}$ | CIELAB $b^*_{white}$ | CIELAB $L^*_{black}$ | Opacity value L [%] |
| Example 1 | 1.8 | 32.3 | 93.4 | −1.3 | 2.2 | 90.1 | 91.2 |
| Comparative example 1 | 2.2 | 32.9 | 93.3 | −1.3 | 2.1 | 89.9 | 91.0 |
| Comparative example 2 | 2.1 | 32.3 | 93.2 | −1.3 | 2.2 | 89.8 | 90.9 |

Test Results

Table 1 shows the test results for laminates produced using the pigment according to the invention (Example 1) and using two reference pigments (Comparative examples 1 and 2). It can be seen that, when identical pigment quantities are incorporated, the pigment according to the invention displays substantially higher retention than the reference pigments.

Table 2 likewise shows test results for laminates produced using the pigment according to the invention (Example 1) and using two reference pigments (Comparative examples 1 and 2), but with incorporation of a substantially reduced quantity of the pigment according to the invention (Example 1). It can be seen here that, even with a lower pigment weight of 1.8 g for Example 1, compared to 2.2 g and 2.1 g (Comparative examples 1 and 2), virtually identical ash contents and yet improved opacity are achieved. The good other optical properties are preserved. The light-fastness of the laminates containing the pigment according to the invention and the reference pigments was comparably good.

Obviously, many modifications and variations of the present invention are possible in light of the above teachings. It is therefore to be understood that, within the scope of the appended claims, the invention may be practiced otherwise than as specifically described.

We claim:

1. A method for the surface treatment of titanium dioxide $TiO_2$ pigment particles, comprising the steps:
   a) adding an aluminium component and a phosphorus component to a $TiO_2$ suspension while the pH value of the suspension is maintained at a value greater than or equal to 10; and then
   b) adding an acid component to the suspension until the the pH value is less than 9 and then;
   c) adding an alkaline aluminium compound to the suspension, wherein an acid compound is added in parallel to keep the pH value of the suspension relatively constant in the range from 4 to 9 during the addition of the alkaline aluminum compound.

2. The method of claim 1, wherein in Step a), water-soluble aluminium Compounds are used as the aluminium component and inorganic phosphate compounds or phosphoric acid are used as the phosphorus component.

3. The method of claim 1, wherein in step b), an acid or an acid-reacting salt is used as the acid component.

4. The method of claim 1, wherein a pH value of at least 10.5 is maintained during step a).

5. The method of claim 4, wherein a pH value of at least 11 is maintained during step a).

6. The method of claim 1, further comprising,
   d) adding a mixture to the suspension in a final step, the addition of the mixture resulting in a pH value of roughly 6 to 7 of the suspension.

7. The method of claim 1, wherein pigment particles resulting from steps a through c consist of from 2.0% to 9.0% by weight of aluminum component, wherein the weight of the aluminum component is calculated as weight of $Al_2O_3$.

8. The method of claim 7, wherein pigment particles resulting from steps a through c consist of from 4.0% to 6.0% by weight of aluminum component, wherein the weight of the aluminum component is calculated as weight of $Al_2O_3$.

9. The method of claim 1, wherein an inorganic layer is applied to the surface of particles in the suspension after step c).

10. The method of claim 1 wherein pigment particles resulting from steps a through b, consist of from 2.0% to 9.0% by weight of aluminum component wherein the weight of the aluminum component is calculated as weight of $Al_2O_3$.

11. The method of claim 10, wherein pigment particles resulting from steps a through b consist of from 4.0% to 6.0% by weight of aluminum component, wherein the weight of the aluminum component is calculated as weight of $Al_2O_3$.

12. The method of claim 1, wherein pigment particles resulting from steps a through b consist of from 1.0% to 5.0% by weight of phosphorous component, wherein the weight of the phosphorous component is calculated as weight of $P_2O_5$.

13. The method of claim 12, wherein pigment particles resulting from steps a through b consist of from 1.5% to 3.5% by weight of phosphorous component, wherein the weight of the phosphorous component is calculated as weight of $P_2O_5$.

14. The method of claim 13, wherein pigment particles resulting from steps a through b consist of from 2% to 3% by weight of phosphorous component, wherein the weight of the phosphorous component is calculated as weight of $P_2O_5$.

15. The method of claim 1, wherein metal salt solutions selected from the group consisting of Ce, Ti, Si, Zr and Zn are added to the suspension in step a) together with the Al component and the P component.

16. The method of claim 1, wherein an inorganic layer is applied after step b).

17. The method of claim 1, wherein the pigment particles resulting from steps a through c are treated with nitrate in so that finished pigment particles contain up to 1.0% by weight $NO_3$.

18. The method of claim 1, further comprising applying an organic substance to the surface of pigment particles produced in steps a through c during a final milling step.

19. The method of claim 1, wherein the acid compound added in step c) is aluminum sulfate.

20. The method of claim 1, wherein a first inorganic layer is applied to the surface of particles in the suspension alter step b), and wherein a second inorganic layer is applied to the surface after step c).

21. The method of claim 1, further comprising:
   d) adding the suspension to a suspension of fibers for providing a decorative laminating paper.

22. A method for the surface treatment of titanium dioxide $TiO_2$ pigment particles, comprising the steps of:
   a) adding an aluminium component and a phosphorus component to a $TiO_2$ pigment suspension while the pH value of the suspension is maintained at a value greater than or equal to 10; and then
   b) adding aluminum sulphate to the suspension until the the pH value of the suspension is less than 9; then,
   c) adding an alkaline aluminium compound to the suspension, wherein an acid is added in parallel to keep the pH value of the suspension relatively constant in the range from 4 to 9 during the addition of the alkaline aluminum compound; then
   d) adding a sodium aluminate/aluminium sulphate mixture to the suspension to bring the pH value to roughly 6 to 7; then
   e) separating solid pigment particle components from the suspension and washing away water soluble salts; then
   f) treating the separated and washed pigment particle components with nitrate in so that finished pigment particles contain up to 1.0% by weight $NO_3$.

* * * * *

UNITED STATES PATENT AND TRADEMARK OFFICE
CERTIFICATE OF CORRECTION

PATENT NO.         : 7,147,702 B2
APPLICATION NO. : 10/889287
DATED              : December 12, 2006
INVENTOR(S)        : Drews-Nicolai et al.

It is certified that error appears in the above-identified patent and that said Letters Patent is hereby corrected as shown below:

On the title page, insert item --(30) Foreign Application Priority Data:
    July 18, 2003    (DE)              103 32 650.2-41--

Signed and Sealed this

Twenty-second Day of July, 2008

JON W. DUDAS
*Director of the United States Patent and Trademark Office*